Patented Mar. 18, 1930

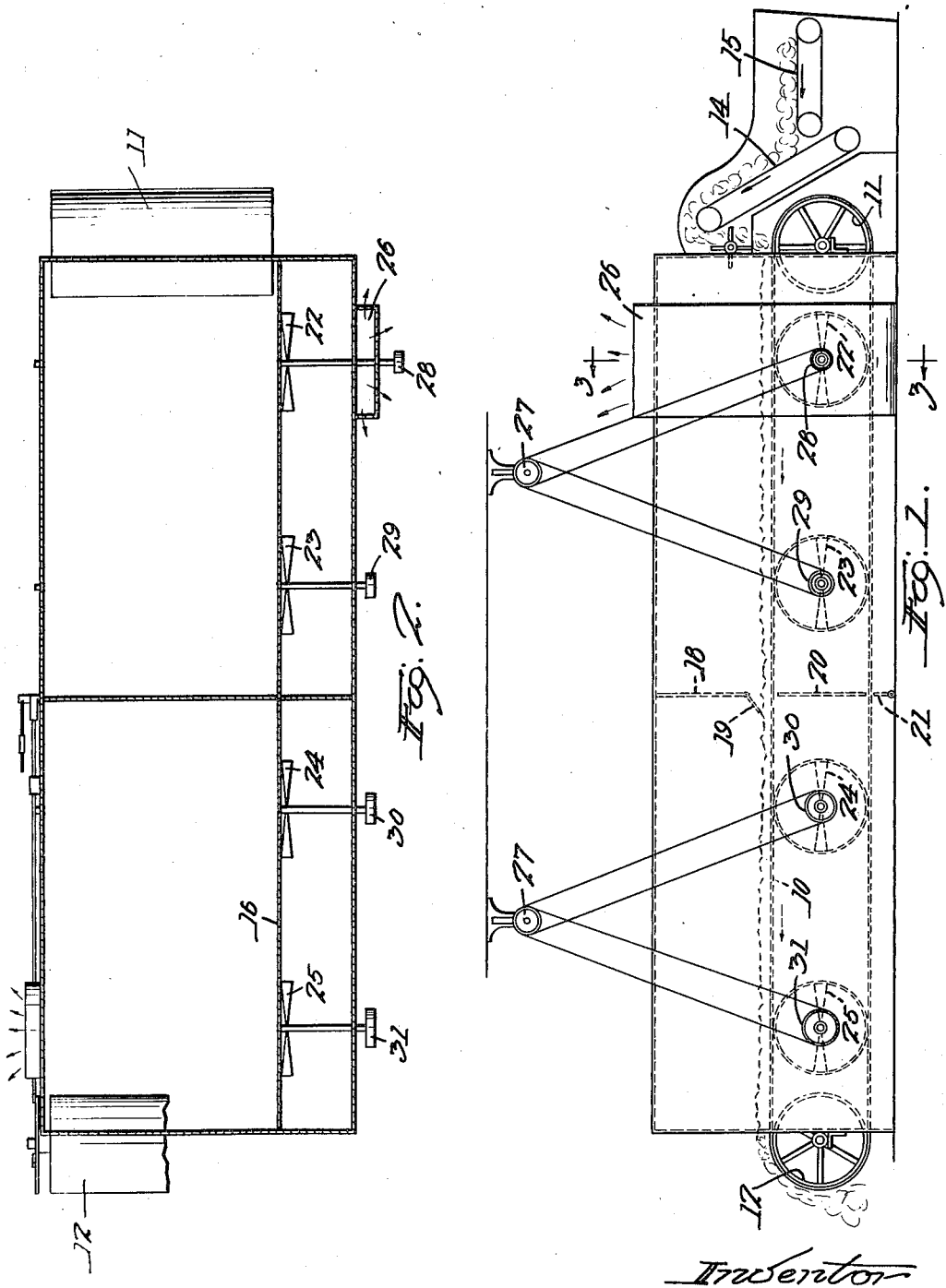

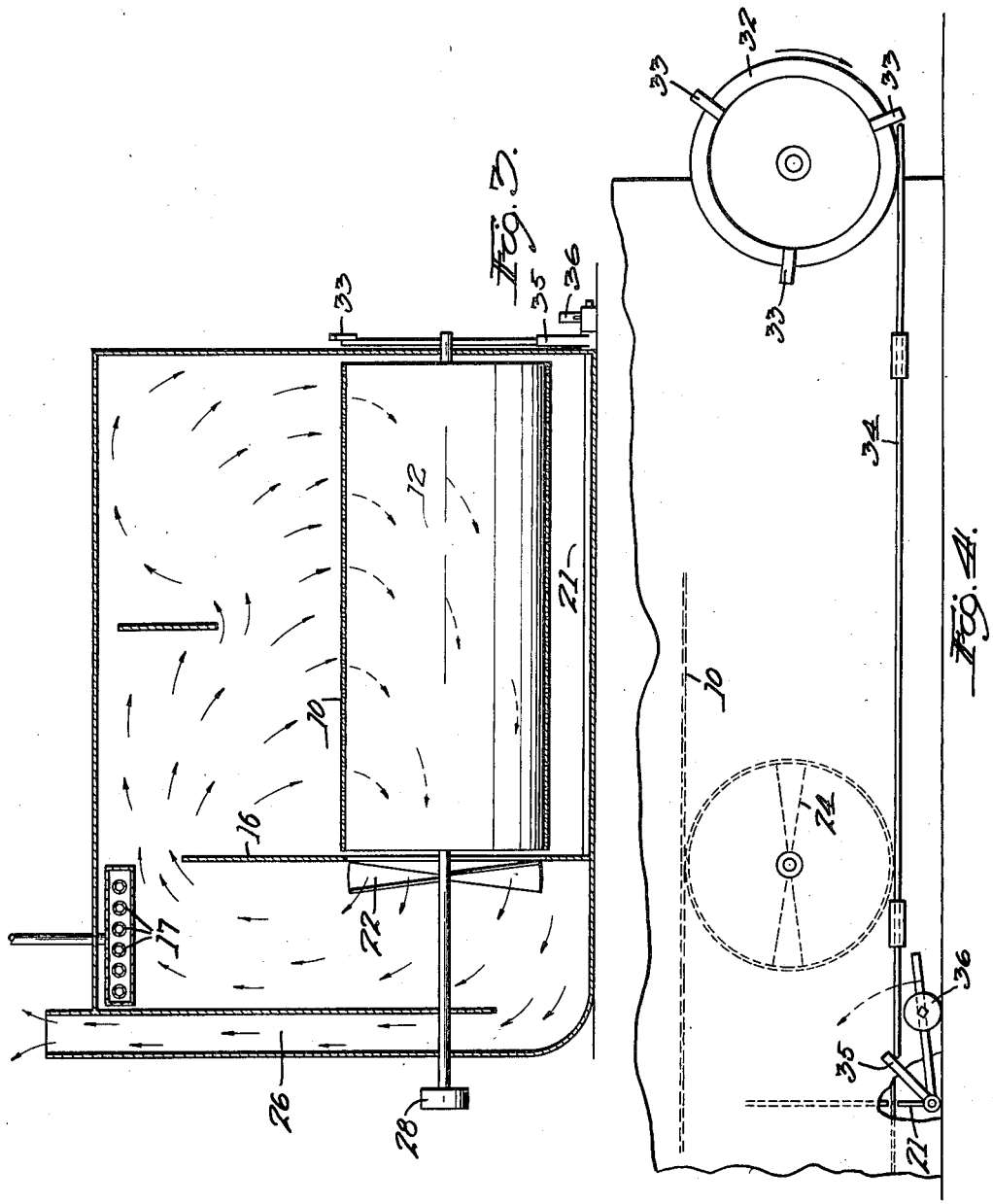

1,750,839

UNITED STATES PATENT OFFICE

FRANK L. FURBUSH, OF WESTFORD, MASSACHUSETTS, ASSIGNOR TO C. G. SARGENT'S SONS CORPORATION, OF GRANITEVILLE, MASSACHUSETTS, A CORPORATION OF MASSACHUSETTS

ONE-APRON DRIER

Application filed July 1, 1929. Serial No. 375,042.

This invention relates to a drier for fibrous or other material.

The principal objects of the invention are to provide for more effectively applying the air currents to dry the material on the apron by changing the speed of the air currents in a certain definite way throughout the course of the air from one end of the machine to the other, and to provide for intermittently allowing the air to pass from one compartment to another so as to control the passage of the air through the material to be dried, and thus effectively controlling the drying operation and economizing in the use of heat.

Other objects and advantages of the invention will appear hereinafter.

Reference is to be had to the accompanying drawings in which

Fig. 1 is a side view of a drier constructed in accordance with this invention;

Fig. 2 is a plan of the same, with the top removed;

Fig. 3 is a sectional view on the line 3—3 of Fig. 1, and

Fig. 4 is an enlarged view, showing the control of the dampers.

I have shown the invention as applied to a one-piece drier in which the material is fed on the top of a continuous apron 10 at the entrance end over a drum 11 which carries the apron at that end. This drum is located mainly outside the casing which encloses the drier. The other end of the apron is carried by a drum 12. The material is fed to the apron over the top of the drum 11 by aprons 14 and 15 in a well known way.

Along one side of the apron is a longitudinal stationary partition 16 extending throughout the length of the drier and behind this are steam coils 17 for heating the air. The apron 10 is driven in any usual way and the drier is divided up into compartments by transverse partitions 18 having flexible flaps 19 at the bottom which are pivoted or loose so that the material on the apron will hold them in the position indicated in Fig. 1, enough so that the material will pass under them and yet they will not allow much air to pass through. They are located in the space between the upper partition 18 and a lower partition 20. Below the lower partition is a damper 21 which is operated as will be described.

The drier can be formed in as many compartments as may be desired, only two being shown herein. The air is forced out of the compartments by a series of fans or blowers 22, 23, 24 and 25, which take the air out of the compartments and circulate it back through the steam coils over the active strand of the apron and down into the fans again as indicated in Fig. 3. Some of the air is discharged up through an outlet 26 located near the intake end of the drier. The power is shown as transmitted by countershafting above and over pulleys 27. In order to carry out this invention, the pulleys 28, 29, 30 and 31 on the fan shafts are of different sizes, progressing from a small size at the intake end to a large size at the outlet end of the drier. In this way the first fan 22 is operated at a comparatively high speed and each of the other fans, through the drier, is operated progressively at a lower speed so that the last fan is operated at the lowest speed of all. In this way the air where the stock is the wettest will be circulated at the highest speed and at the outlet end where the air coming through the material on the apron is almost dried the speed of the circulating air is slowest. This provides for circulating the air in accordance with the moisture therein, the air with the most moisture being circulated with the greatest speed to provide for more rapid operation at those parts of the machine in which there is the most moisture and therefore the most need of circulating it rapidly. Not so much is wasted in driving the fans at the dry end.

The compartments can be considered as normally substantially closed, so that the circulation in each compartment is independent of that in the others. This, of course, would not result in effective operation if this condition were maintained. For the purpose of letting the air through from one compartment to the other, the damper 21 is employed at the bottom of the partition 18—20. This damper is operated periodically, as shown in Fig. 4, by projections 33 on a wheel 32 on the shaft of the drum 12. Two or more times during each rotation of the drum these projections will operate a rod 34 and push it against an operating handle 35 connected with the damper 21. The parts 21 and 35 are rigid with respect to each other and are pivoted on studs and also provided with a weight 36, or equivalent device, for holding the damper closed normally and forcing the rod 34 back after it has been pushed forward. It will be seen therefore that this damper 21 is opened and closed periodically for the purpose of allowing a current of air to pass from one chamber to another and then closing it so that the air cannot operate in that manner except for a short period of time.

In this way the air is circulated through the material to be dried by the fans in each compartment a short time before part of it is allowed to escape into the next compartment toward the end of the machine from which the wettest air is finally discharged. This control of the passage of the air from one compartment to another cooperates with the difference in the speeds of the fans to secure effective drying in each compartment by the air therein before it is allowed to be discharged into the next one. The whole result is economy in the operation of the machine and in the consumption of power for driving the air. At the same time, where it is necessary to drive the air rapidly, this is accomplished by the highest speed of the fans in the last compartment. These fans have to drive out the air which has been used in the rest of the machine and which is employed to take out the first moisture from the wet material as it is introduced into the machine.

Although I have illustrated and described only one form of the invention, I am aware of the fact that modifications can be made therein by any person skilled in the art without departing from the scope of the invention as expressed in the claims. Therefore, I do not wish to be limited to all the details of construction herein shown and described, but what I do claim is:—

1. In a drier, the combination with an apron for conveying the material to be dried, of a series of fans located between the strands of the apron, and means for driving the fans at the feed or wet end of the apron faster than the fans at the discharge or dry end of the conveyor.

2. In a drier, the combination with a casing and an apron therein for carrying the material to be dried from one end of the casing to the other, of means at the side of the apron for heating the air, a series of fans for blowing the air out from the apron into the heating zone, and means for driving all the fans at different speeds, varying progressively from a slow speed at the discharge end of the apron to a high speed at the intake end of the apron.

3. In a drier, the combination with a casing divided by stationary partitions into compartments, and a continuous apron extending through all of said compartments from one end of the casing to the other, of a damper at the bottom of each of said partitions, means for driving said fans at higher speeds at the discharge end of the apron than at the intake end, and means for periodically opening said damper to allow the air to pass from one chamber to another.

4. In a drier, the combination with an apron for conveying the material from one end of the drier to the other and means for driving the dry air from the delivery end back to the wet end and exhausting a portion of the same at the wet end, and means whereby the air will move faster as it approaches the wet end.

5. In a drier, the combination with an apron for conveying the material from one end of the drier to the other and means whereby the air will move faster as it approaches the wet end, said drier being divided into compartments, of a damper at the bottom of each compartment below the apron, and means operated in synchronism with the apron for periodically opening and closing said damper to connect the compartments intermittently and allow the air to flow from the wet end of the machine toward the dry end under said partitions.

In testimony whereof I have hereunto affixed my signature.

FRANK L. FURBUSH.